R. M. DEAN.
SPEED INDICATOR FOR PASSING VEHICLES.
APPLICATION FILED NOV. 18, 1909.
1,098,358. Patented May 26, 1914.
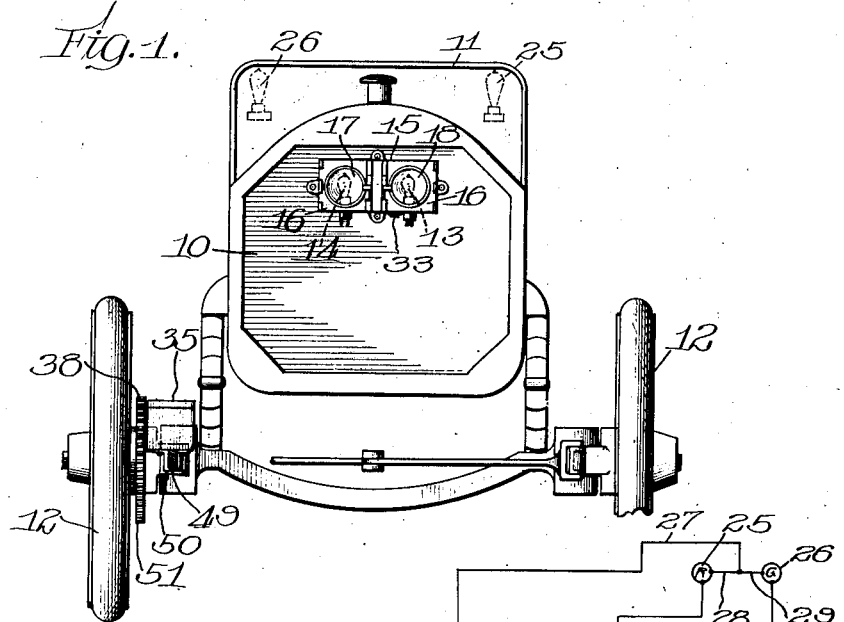
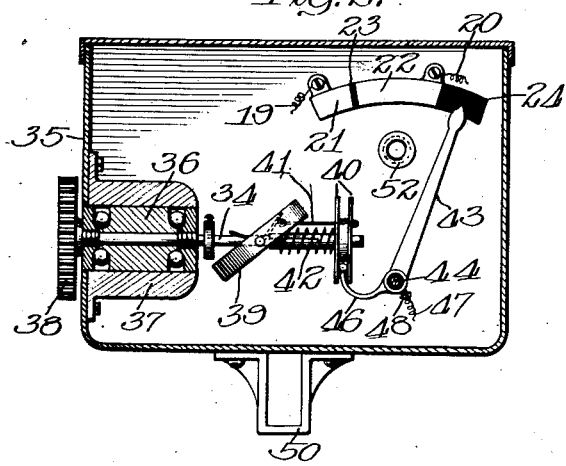
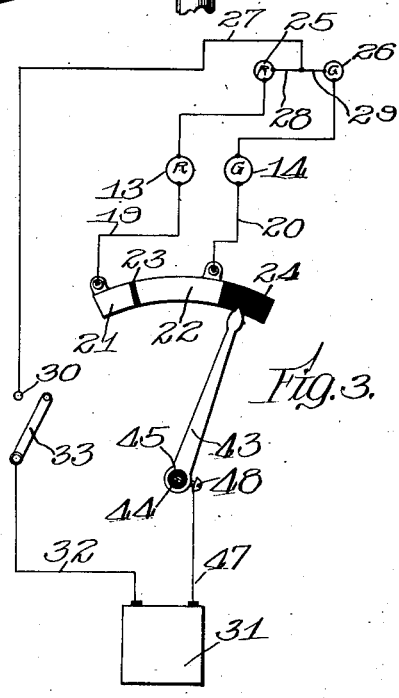
Witnesses:
Inventor:
Roy M. Dean

UNITED STATES PATENT OFFICE.

ROY M. DEAN, OF CHICAGO, ILLINOIS.

SPEED-INDICATOR FOR PASSING VEHICLES.

1,098,358. Specification of Letters Patent. Patented May 26, 1914.

Application filed November 18, 1909. Serial No. 528,685.

*To all whom it may concern:*

Be it known that I, ROY M. DEAN, a citizen of the United States, residing at Chicago, in the county of Cook and State of Illinois, have invented certain new and useful Improvements in Speed-Indicators for Passing Vehicles, of which the following is a specification.

This invention relates to improvements in combined signals and speed indicators for passing vehicles especially adapted for use on motor or speeding vehicles, for the purpose of indicating to the chauffeur or driver, and also to the public or "spotters", the speed a vehicle is traveling, and especially after dark, at which time it has heretofore been almost impossible to satisfactorily obtain such information.

A further object is to provide improved means for indicating the speed within predetermined speed limits and for automatically indicating an excess or increase of speed beyond the speed limit.

A further object is to provide an improved signal and indicator of this character which will be simple, durable, cheap and compact in construction and effective and efficient in operation and which may be readily applied to any vehicle and as readily removed.

To the attainment of these ends and the accomplishment of other and useful objects as will appear, the invention consists in the features of novelty in the construction, combination and arrangement of the several parts hereinafter more fully described and claimed and shown in the accompanying drawing illustrating an embodiment of the invention, and in which—

Figure 1 is an elevation, partly broken away, of the front end of a motor vehicle having an attachment constructed in accordance with the principles of this invention applied thereto; Fig. 2 is an enlarged sectional view of the controlling or operating mechanism for the system; Fig. 3 is a diagram of the wiring.

Referring more particularly to the drawing in the present exemplification of the invention, the numeral 10 designates the radiator which is mounted upon the front of the vehicle in the ordinary and usual manner; 11 indicates the dashboard and 12 the front wheels of the vehicle which are operated or adjusted by the ordinary tiller rod controlled by the chauffeur.

Mounted upon the vehicle in any suitable or convenient position, so that they may be readily seen from the outside of the vehicle, are two lamps 13, 14, preferably of the electric type, and these lamps may be incased within a suitable housing designated generally by the reference numeral 15, which housing may be provided with suitable doors or closures 16, in which are mounted lenses 17, 18. The lamps 13, 14 are differentiated from each other preferably by means of colors, which may be accomplished in any desired or suitable manner, either by coloring the globes of the lamps or by providing lenses 17, 18 of different colors.

In carrying this invention into operation it has been found desirable to provide colored lenses, such as green and red, and to arrange the lenses so that the red lens or light will be located toward the left side of the vehicle while the green lens or light is located adjacent the right side. Leading respectively from the lamps 13, 14 are conductors 19, 20 which connect respectively with contact plates 21, 22 insulated from each other as at 23 by means of suitable insulating material, and the plate 22 is provided with an insulating section 24 extending beyond one end thereof. Arranged in series with the lamps 13, 14 are a second pair of lamps 25, 26, and a conductor 27 is connected by means of the branches 28, 29 to the lamps 25, 26. The conductor 27 terminates in a contact point 30.

The lamps are supplied with electric energy from any suitable source which, in the present exemplification of the invention, is shown as a battery, preferably of the storage type. Leading from one side of the battery 31 is a conductor 32 which terminates in a switch member 33 adjacent the contact 30, and this switch member 33 is adapted to be moved into and out of engagement with the contact 30 to render the mechanism active or inactive when desired. Any suitable means may be provided for automatically making and breaking the circuit successively through the lamps, and which means is controlled by the speed of the vehicle.

In the present exemplification of the invention there is shown a governor which comprises a shaft 34 mounted within a suitable housing designated generally by the reference numeral 35. One end of this shaft 34 is journaled in a suitable bearing 36, housed by means of a suitable housing 37, and which latter is preferably supported by one wall of the housing 35. The extremity of the shaft 34 preferably projects beyond one side of the wall 35 and secured thereto is a gear 38. A centrifugally controlled member 39 is pivotally mounted upon the shaft 34 beyond the bearing 36 and slidably mounted upon the shaft 34 are spaced disks 40 which are connected in any desired or suitable manner, such as by means of a connecting member 41 to the centrifugally controlled member 39 so that as the shaft 34 rotates, the member 39 will be thrown about its pivot to cause the spaced members 40 to slide upon the shaft against the tension of an elastic member 42 which is disposed between the member 39 and the members 40.

An arm 43 is pivotally mounted upon a suitable support 44 and is insulated therefrom by a suitable insulating material 45. This arm 43 is so located that one extremity thereof will contact with and move across the contacts 21, 22 and the insulated portions 23, 24 thereof. Any suitable connection may be provided between the spaced members 40 and the arm 43, such as a projecting portion 46, which is secured to the arm 43 and projects into the space between the members 40 so that when the member 39 is thrown about its pivot and the members 40 move on the shaft 34 and longitudinally thereof, the arm 43 will be rocked about its point of pivotal support in either direction, according to the direction of movement of the members 40. A conductor 47 leads from the other side of the battery 41 and is connected by a suitable binding post 48 to the arm 43.

The housing 35, with its contained mechanism, is adapted to be readily mounted upon any suitable support and as readily removed therefrom but is preferably secured to one of the arms 49 of the steering mechanism common in machines of this character, and is secured in position by means of a clip 50. The housing 35 is located in close proximity to the wheels 12 of the vehicle, and secured to one wheel, is a gear wheel 51, with which the gear 38 on the shaft 34 meshes, so that when the operating mechanism just described is secured in position, and the vehicle moved, the gear 51 will impart a rotary motion to the gear 38 to drive the shaft 34.

The conductors 19, 20 and 47 lead from the interior of the housing 35 through a suitable opening 52 in the housing, and this opening 52 is preferably located in a position to prevent the entrance of water into the housing and to prevent mud from being thrown into the housing therethrough while the vehicle is traveling. The lamps 25, 26, which are connected with the lamps 13, 14 and operate simultaneously with the respective lamps 13, 14, are arranged in any suitable and convenient position to be seen by the chauffeur but are preferably secured to the inside of the dashboard 10. These lamps 25, 26 are also differentiated from each other preferably by means of different colored globes or lenses and correspond with the respective lamps 13, 14 so that when the green lamp 13 on the outside of the vehicle is lighted, the green lamp 25 on the inside of the vehicle will also be lighted.

The switch 33 may be located in any suitable position, but is preferably located so as to be inaccessible by the operator when the latter is in the vehicle. A suitable and convenient location for the switch is on the bottom of the housing 15 of the lamps 13, 14, so that the switch will not only be protected from the elements but will be in a position to necessitate the stopping of the vehicle and to compel the operator to get out of the vehicle in order to open the switch.

Assuming the parts to be in the position shown in Fig. 3 in diagram and in Fig. 2, with the exception of the switch 33, which may be assumed to be in a closed position, the operation will be as follows: The portion 22 of the contact for the arm 43 and the controlling mechanism may be so arranged that while the vehicle is traveling between predetermined speeds—that is to say, between five and ten miles an hour, which may be assumed to be the legal rate of speed, the member 39 will be operated by the rotation of the shaft 34 to cause the arm 43 to move from the insulated section 24 onto the section 22 and will remain on this section while the vehicle is traveling between the speeds just mentioned. When the arm 43 engages the contact section 22 and the switch 33 is closed, the circuit will be from the battery through the arm 43, contact 22, conductor 20, green lamp 14, green lamp 26, conductor 27, contact 30, switch 33, conductor 32, back to the other side of the battery, which will light the lamps 14, 26, and these lights will be maintained as long as the arm 43 is in engagement with the contact 22. Should the speed of the vehicle increase, the increased speed or rotation of the shaft 44 will operate still further on the centrifugally controlled member 39 and will tend to move the arm 43 off of the contact section 22 and into engagement with the contact section 21. As the arm moves off of the section 22 the circuit will be broken through the lamps 14, 26 and will be completed through the lamps 13, 25, and as these lamps 13, 25 are of a different color from the lamps 14, 26, preferably red, it will be apparent that a red light will be exposed on the outside of the vehicle as well as a red light inside the vehicle, the former being visible to the "spotter" or public and the latter visible to the chauffeur or driver.

When the speed of the vehicle decreases and comes within the legal speed limits, the arm 43 will automatically move off of the contact section 21 and onto the section 22. This movement of the arm 43 will break the circuit through the lamps indicating the excess speed and will complete the circuit through the lamps indicating the legal speed, or the lamps 14, 26. This improved mechanism may be adjusted to operate on any speeds and by providing the section 24, which is insulated, the arm 43 may be permitted to move any desired distance and will remain out of engagement with the contact 22 until the vehicle reaches a predetermined speed of say five miles an hour.

The switch 33 is provided, in order that the signal may be thrown out of operation or rendered inactive during the daytime and by being located outside of the vehicle it will be apparent that the chauffeur who desires to speed his vehicle when he thinks there is no "spotter" stationed along the line of travel, cannot do so without displaying the signals, unless he stops his vehicle to open the switch. This will necessitate his again stopping the vehicle when he comes within the patrolled district so that he can throw the mechanism into operation again.

While in the present exemplification of the invention there is shown and described a certain form of governor or actuating mechanism for the arm 43, it is to be understood that the specific construction of this mechanism forms no part of the present invention, as any form of governor which will be automatically operated directly from and by the wheel of the vehicle may be employed without departing from the spirit of this invention. It is also to be understood that the invention is not necessarily limited to the employment of electric lights, as any other form of indicator, which may be seen from a passing vehicle, may be employed with equal efficiency.

In order that the invention might be fully understood, the details of the foregoing movement thereof have thus been specifically described.

What I claim as new is:

The combination of an automobile having a dashboard and a front hood, a pair of indicator lamps located on said dashboard in position to be seen from the operator's seat, a second pair of indicator lamps located on the front of said hood in position to be seen from a position in front of the machine, a switch comprising a plurality of insulated contacts arranged in an arc, a contact arm pivoted to sweep over said contacts and make electrical contact therewith, a source of current connected to said arm, a circuit leading from one of said contacts and including one of said lamps on said hood and one of said lamps on said dash in series, a second circuit leading from another contact and including the other of said lamps on said hood and dash in series, said circuits being connected to the source of current, and means responsive to the speed of the automobile for actuating said arm to move it over said contacts and complete one or the other of said lamp indicator circuits in accordance with the speed of the automobile.

In testimony whereof I have signed my name to this specification, in the presence of two subscribing witnesses, on this 15th day of November A. D. 1909.

ROY M. DEAN.

Witnesses:
J. H. JOCHUM, Jr.,
M. W. CANTWELL.